United States Patent [19]

Egawa et al.

[11] Patent Number: 5,534,944
[45] Date of Patent: Jul. 9, 1996

[54] METHOD OF SPLICING MPEG ENCODED VIDEO

[75] Inventors: Ren Egawa, Princeton, N.J.; Edwin R. Meyer, Bensalem, Pa.

[73] Assignee: Matsushita Electric Corporation of America, Secaucus, N.J.

[21] Appl. No.: 505,581

[22] Filed: Jul. 21, 1995

Related U.S. Application Data

[63] Continuation-in-part of Ser. No. 276,515, Jul. 15, 1994.
[51] Int. Cl.[6] .................................................. H04N 9/74
[52] U.S. Cl. .......................... 348/584; 348/426; 348/432; 348/473; 370/94.1
[58] Field of Search .................................. 348/469, 467, 348/461, 485, 584, 426, 432, 473, 588, 598, 599, 722, 419; 370/118, 82, 17, 94.1; H04N 7/04, 7/08, 7/087, 7/093, 9/76, 9/74, 7/12

[56] References Cited

PUBLICATIONS

"Information Technology—Genetic Coding of Moving Pictures and Associated Audio", ISO/IEC JTC1/SC29/WG11, N0721 rev., pp. 20–26, (Jun. 10, 1994).

"Information Technology—Generic Coding of Moving Pictures and Associated Audio", ISO/IEC JTC1/SC29/WG11 N0702 rev., pp. 149–153 (Mar. 25, 1994).

*Primary Examiner*—Safet Metjahic
*Assistant Examiner*—Nina M. West
*Attorney, Agent, or Firm*—Ratner & Prestia

[57] ABSTRACT

A method of splicing two compressed video signals which have been encoded according to the standard adopted by the Moving Picture Experts Group (MPEG) determines an amount of null information that is to be inserted between the two video signals in order to ensure that an input buffer of an MPEG decoder does not overflow after receiving the spliced video signals. The method allows a splice to occur after any access unit (picture) in the first compressed video signal. The amount of null information is determined from the data rates of the first and second compressed video signals and the amount of new data which is provided to the buffer before the data is retrieved from the buffer for both the first and second video signals. The video signals are spliced by inserting the null information, as sequence stuffing bits into a buffer immediately after the selected picture in the first video signal. The second video signal is transmitted to the buffer immediately after these stuffing bits.

16 Claims, 9 Drawing Sheets

METHOD OF SPLICING MPEG ENCODED VIDEO

This application is a continuation-in-part of application Ser. No. 08/276,515 filed Jul. 15, 1994.

BACKGROUND OF THE INVENTION

This invention concerns the processing of video signals encoded according to the standard adopted by the Moving Picture Experts Group (MPEG) and in particular, a method of splicing an MPEG encoded data stream from a first source to an MPEG encoded data stream from a second source in a manner that ensures that no video data is lost when the combined image is reproduced.

In the United States a standard has been proposed for digitally encoded high definition television signals. This standard is essentially the same as the MPEG-2 standard, proposed by the Moving Picture Experts Group (MPEG) of the International Standards Organization (ISO). This standard is described in a draft international standard (DIS) publication entitled "Information Technology—Generic Coding of Moving Pictures and Associated Audio, Recommendation H.262" which is available from the ISO and which is hereby incorporated by reference for its teaching on the MPEG-2 systems standard "ISO/IEC 13818-1" and for its teachings on the MPEG-2 digital video encoding standard "ISO/IEC 13818-2."

The MPEG-2 standard is actually several different standards. In MPEG-2 several different profiles are defined, each corresponding to a different level of complexity of the encoded image. For each profile, different levels are defined, each level corresponding to a different image resolution. One of the MPEG-2 "standards", known as Main Profile, Main Level is intended for encoding video signals conforming to existing television standards (i.e., NTSC and PAL). Another "standard" known as Main Profile High Level is intended for encoding high-definition television images. Images encoded according to the Main Profile, High Level standard may have as many as 1,152 active lines per image frame and 1,920 pixels per line. It is this standard which is currently being implemented as the United States HDTV standard.

The MPEG-2 standard defines a complex syntax which contains a mixture of data and control information. Some of this control information is used to enable the signals having several different formats to be covered by the standard. These formats define images, having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in six layers, the sequence layer, the group pictures layer, the picture layer, the slice layer, the macro block layer, and the block layer. Each of these layers is introduced with control information and "stuffing" characters. The stuffing characters are inserted as needed to ensure that the data rate of the input data stream matches the rate at which pictures are displayed. Finally, other control information, also known as side information, (e.g. frame type, macroblock pattern, image motion vectors, coefficient zig-zag patterns and dequantization information) are interspersed throughout the coded bit stream.

To effectively receive the digital images, a decoder must recognize the control portions, extract the necessary control information, and use the extracted data to process the video signal information. One piece of information that is specified for each sequence layer is the video buffering verifier (VBV) buffer size. The VBV buffer size value specifies a number of bits of input data from the video sequence which must be stored in the input buffer of the decoder before the video sequence may be decoded. If this number of bits is stored when the decoding operation begins, the input buffer will neither become too full (overflow) or become empty (underflow) during the processing of the video sequence.

The VBV buffer size value assumes that the input buffer is empty when the new sequence data is received or, at least that all of the data in the input buffer will be removed before the contents of the input buffer reach the VBV buffer size value. To ensure that the VBV buffer size value does not cause the input buffer to overflow or underflow, it is preferred in the MPEG standard that any image splicing be done on a sequence boundary.

This may be unacceptable, however, for video editors who would like to switch from one scene to another after a particular picture has been displayed, irrespective of whether that picture is at a sequence boundary. It may also be undesirable for broadcasters who wish to insert short program segments, for example station identification messages or advertisements into an HDTV program at arbitrary intervals.

If splicing is not done at a sequence boundary then the data already resident in the input buffer may not be read from the buffer for processing until the buffer overflows due to the new data from the inserted sequence. Alternatively, the data already resident in the input buffer may cause the decoder to prematurely indicate that the VBV buffer size criterion has been met. In this instance, the decoder may cause the input buffer to either overflow or underflow in the processing of the stored data.

One method of solving this problem is proposed in the MPEG-2 standard DIS ISO/IEC 13818-1. By this method, certain access units, or pictures, in the data stream are marked with a SEAMLESS_SPLICE_FLAG. This flag is used to mark safe locations for splicing an inserted sequence into the main sequence. As with the conventional splicing method, however, there are only a limited number of access units which satisfy the criteria to have this flag set. Furthermore, this splicing method limits the bit rate of the inserted stream to a certain level to meet its criteria and the inserted stream can not be a variable bit rate stream.

Another method would be to define a format within the MPEG standard which allows for easy insertion and provide a flag identifying this format. This method, however, cannot handle incompatible formats and reduces the robustness of the MPEG standard.

SUMMARY OF THE INVENTION

The present invention is embodied in a method of processing a main MPEG encoded sequence to allow another sequence to be inserted at any picture boundary in the main sequence. According to the present invention, the main and inserted MPEG sequences are analyzed to determine a number of stuffing characters to insert in the data stream after the selected picture boundary and before the inserted sequence. The stuffing characters are ignored during the decoding operation and allow the input buffer to be emptied to a level compatible with the inserted sequence. This number stuffing characters is determined from the data rates of the main and inserted sequences and the intervals between respective points in time corresponding to the start of the insertion and the next decoding time stamps in both the main and inserted sequences. The method inserts this number of stuffing characters after the selected splice point and then inserts the inserted sequence.

DETAILED DESCRIPTION

Figure 1:
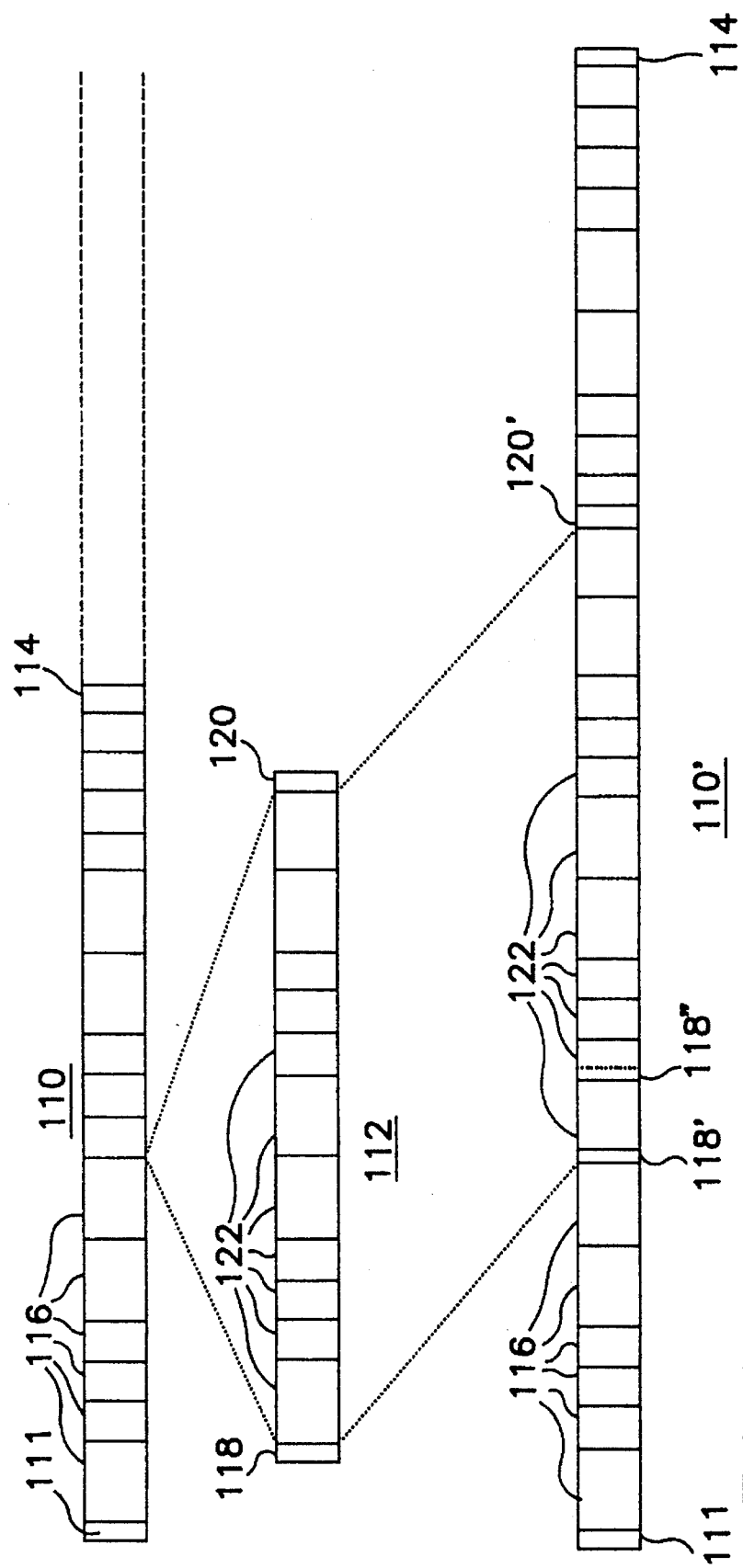
FIG. 1 is a data diagram which illustrates an insertion operation according to the present invention.

FIG. 1 is a data diagram which illustrates the splicing operation. In this figures, a sequence 112 is inserted into a sequence 110 of the main HDTV signal to form a modified sequence 110'. As shown in FIG. 1, the main MPEG sequence 110 includes a sequence header 111, including a sequence start code, several access units (pictures) 116 and a sequence end code 114. For the sake of simplicity, the group of pictures layer, which is between the sequence layer and the picture layer is not shown in FIG. 1. The sequence to be inserted, 112, also includes a sequence header 118, several access units 122 and a sequence end code 120.

As defined in the MPEG standard, each sequence start code may be preceded by a string of zero-valued stuffing bits. In the MPEG standard, these bits represent null information which is ignored by the decoder and are not written into the input buffer. The stuffing bits are used to ensure that the rate at which data is being supplied matches the rate at which images, derived from the data, are being displayed. While these stuffing bits are being received, the decoder is reading data from the input buffer for display. Thus, the amount of data held in the input buffer is reduced while the stuffing bits are being received.

The combined sequences are shown as the modified data stream 110' of FIG. 1. This data stream includes the sequence header 112, access units 116, a modified sequence header 118' access units 122 and a modified sequence end code 120'. The modified sequence start code 118' includes a sequence end code, which marks the end of the first part of the previous main sequence, a number, NSTUFF, of stuffing bits, the sequence start code for the inserted sequence and the modified header for the inserted sequence. The bit-rate field of the original header for the inserted sequence is modified to be FFFF hexadecimal, indicating a variable bit-rate sequence. This change is made only if the bit rate of the inserted sequence is different from that of the main sequence and the original inserted sequence was a constant bit-rate sequence.

The method according to the present invention splices the start of one sequence to an arbitrary access unit in another sequence. The insertion of the sequence is completed only after the remaining part of the original sequence is spliced to the inserted sequence in the same way that the inserted sequence was spliced to the main sequence. Thus, the modified sequence header 120' also includes a sequence end code, some stuffing bits and the modified sequence header for the main sequence. As with the modified sequence header 118', the sequence header 120' may have its bit-rate field changed to FFFF hexadecimal, indicating a variable bit-rate sequence, if the bit-rates of the main and inserted sequences differ and if the original main sequence used a constant bit-rate.

The number of stuffing bits to be added is determined by the method of the subject invention as described below with reference to FIGS. 5 and 6. The actual splicing operation is performed as described below with reference to FIGS. 2, 3 and 7.

Figure 2A:
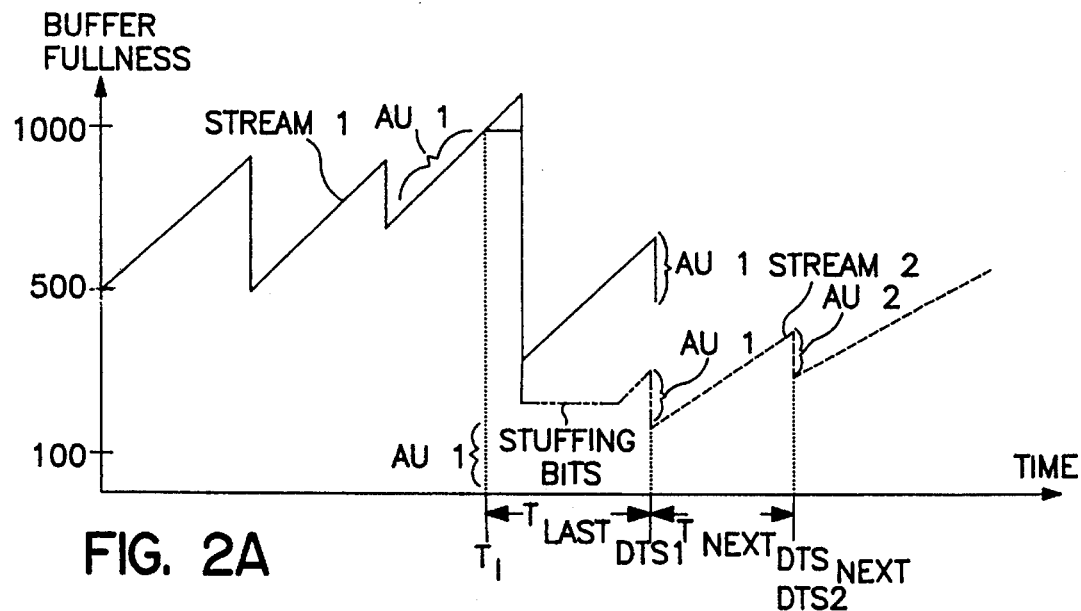
FIGS. 2a and 2b are graphs of buffer fullness versus time which are useful for explaining the operation of the present invention for fixed data rate MPEG-2 encoded signals.
Figure 2B:
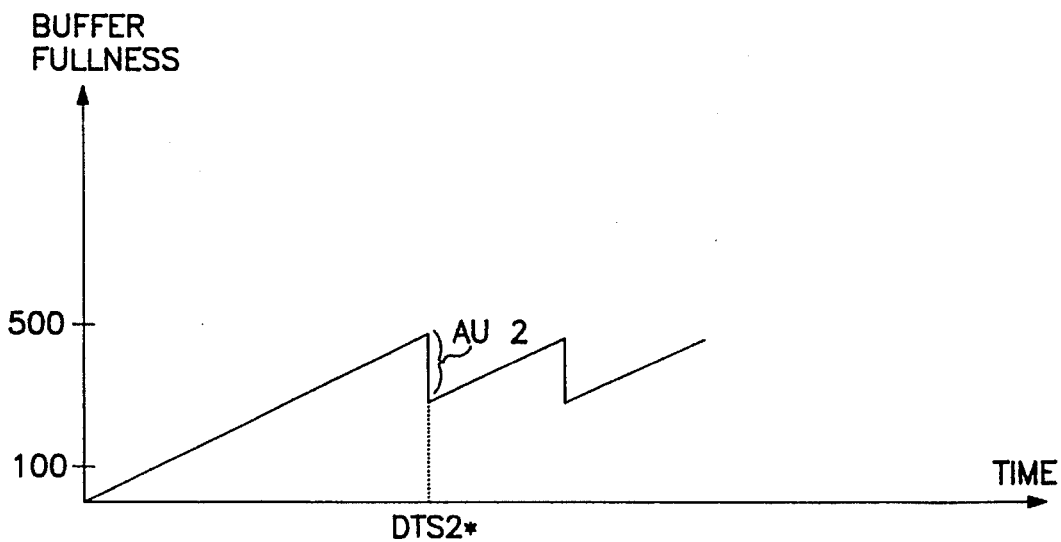

FIGS. 2a and 2b are graphs of buffer fullness versus time which illustrate the problem addressed by the present invention and the method by which the problem is solved. The solid line in FIG. 2a shows part of the data stream for the main sequence, STREAM1, while the solid line in FIG. 2b shows part of the data stream for the inserted sequence, STREAM2. In the exemplary embodiments of the invention, these data streams are bit-streams. Vertical transitions in these Figures indicate times at which data is being read from the buffer. It is a convention in these types of diagrams that data is modeled as being read from the buffer instantaneously. Portions of the curve which have slanted lines indicate times at which data is being written into the buffer. The slope of these lines is proportional to the data rate of the data stream.

The sequence STREAM2 is to be inserted into the sequence STREAM1 at time $T_I$, immediately after access unit AU1. If the maximum input buffer size used by this example is 1000 then, if STREAM2 were inserted into STREAM1 at time $T_I$, then the buffer would overflow before the VBV buffer size (i.e. 500) for STREAM2 had been reached. To prevent this from occurring, the method according to the present invention inserts a number, NSTUFF, of stuffing bits between the AU1 at time $T_I$ and the start of STREAM2. This is indicated by the dashed line in FIG. 2a. Thus, after $T_I$, instead of following the solid line, the buffer fullness for the MPEG bit stream follows the dashed line. The values $T_{last}$, DTS1, $T_{next}$, $DTS_{next}$ and DTS2 are used, as described below to calculate the optimal value for NSTUFF. While the stuffing bits are being inserted into the data stream, no new data is added to the buffer. New data, representing the inserted sequence is added when the slope of the dashed line is non-zero.

It is noted, from FIGS. 2a and 2b that the rate at which data is provided by STREAM2 is less than the rate at which it is provided by STREAM1. Nonetheless, the first portion of the data of STREAM2, provided between the decoding time stamps DTS1 to $DTS_{next}$, is provided at the same rate as the sequence STREAM1 while the portion of STREAM2 which is provided after $DTS_{next}$ is provided at the same rate as the original STREAM2, shown in FIG. 2b.

Figure 3A:
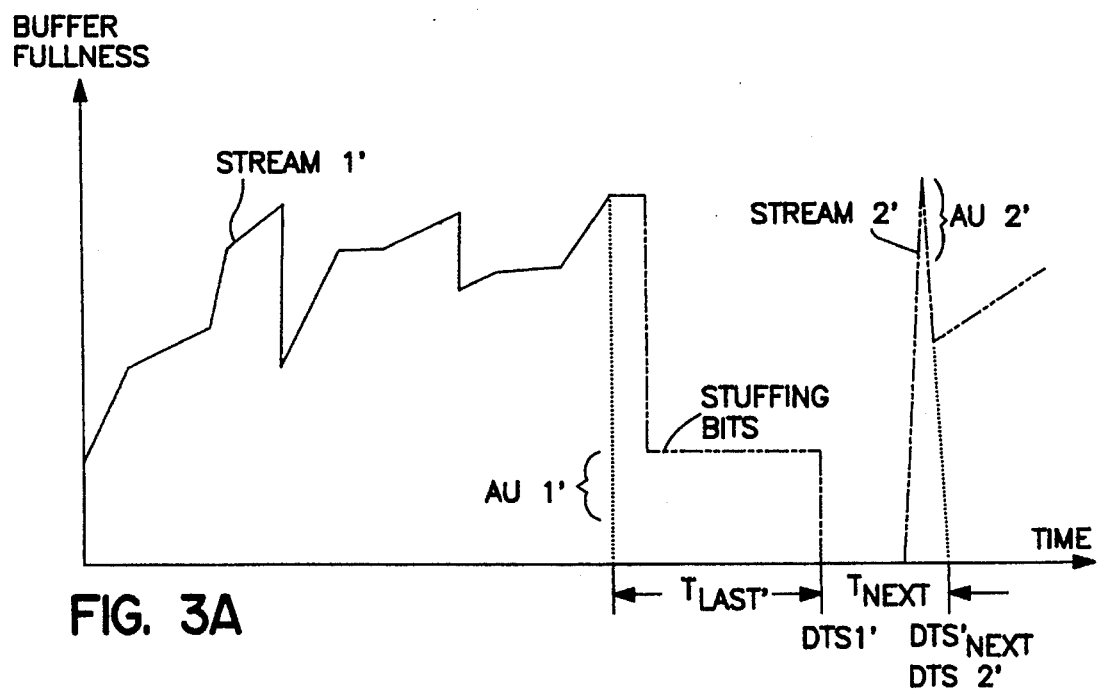
FIGS. 3a and 3b are graphs of buffer fullness versus time which are useful for explaining the operation of the present invention for variable data rate MPEG-2 encoded signals.
Figure 3B:
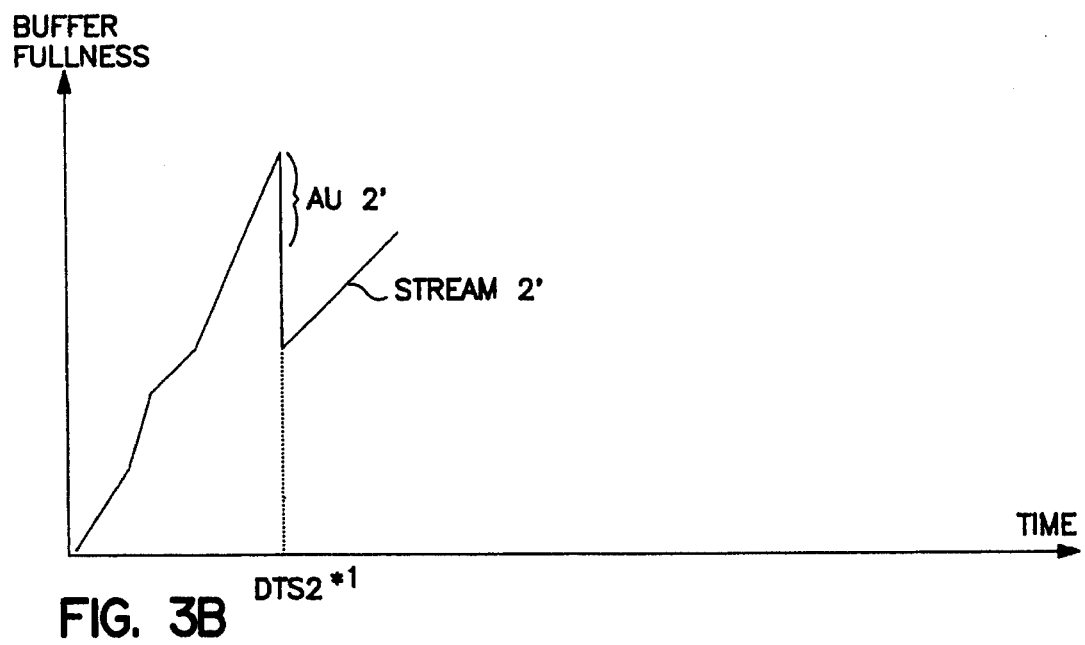

The graphs in FIGS. 2a and 2b illustrate the operation of an exemplary embodiment of the inventive method when the sequences are encoded to have a fixed data rate. FIGS. 3a and 3b illustrate the operation of the method when the sequences are encoded to have a variable data rate. Items in these Figures which correspond to items in FIGS. 2a and 2b are indicated by a prime mark (').

Figure 4:
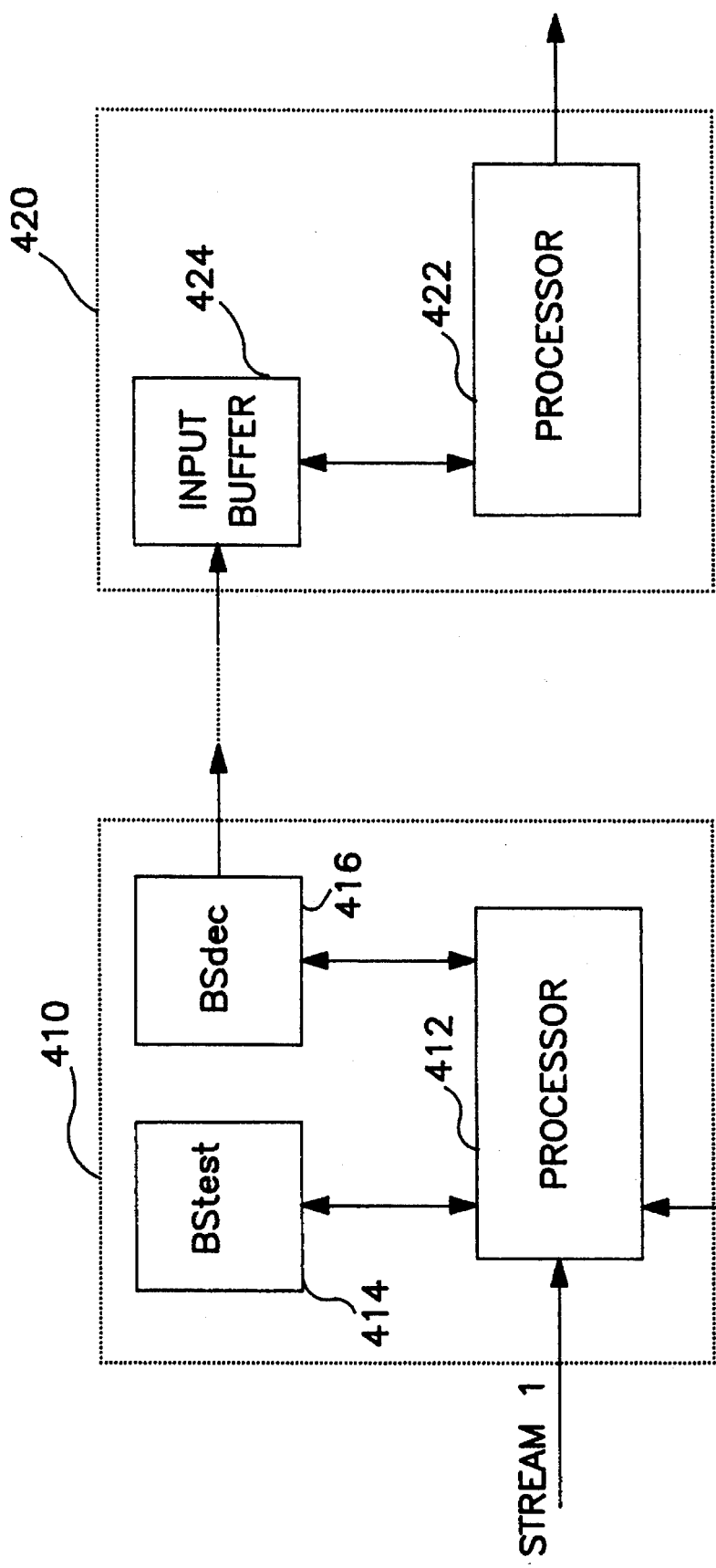
FIG. 4 is a block diagram of circuitry suitable for use in an HDTV or MPEG-2 encoder and decoder which operates in accordance with the present invention.

FIG. 4 is a block diagram showing portions of an MPEG-2 or HDTV splicer and an MPEG-2 or HDTV decoder according to the present invention. The splicer includes a processor 412, which is coupled to receive the main and insert MPEG-2 HDTV signals, STREAM1 and STREAM2, respectively. Each of these signals may be generated by a conventional HDTV encoder, such as is described in U.S. Pat. No. 5,294,974 entitled, HIGH DEFINITION VIDEO ENCODING SYSTEM HAVING COLOR-SENSITIVE QUANTIZATION, which is hereby incorporated by reference for its teaching on HDTV encoders. Alternatively, these signals may be generated by an MPEG-2 encoder such as that described in ISO/IEC 13818-2 DIS, which is hereby incorporated by reference for its teachings on MPEG-2 encoders.

The processor 412 is coupled to two buffers, BStest 414 and BSdec 416. These buffers are preferably identical. The buffer 414 is used to gather information from which the value NSTUFF is calculated. The actual splicing is performed using the buffer 416. The spliced signal is then transmitted from buffer 416 to the input buffer 424 of the decoder 420. The decoder 420 also includes a processor 422 which retrieves data from the input buffer 424 in order to reproduce a moving image.

Figure 5:
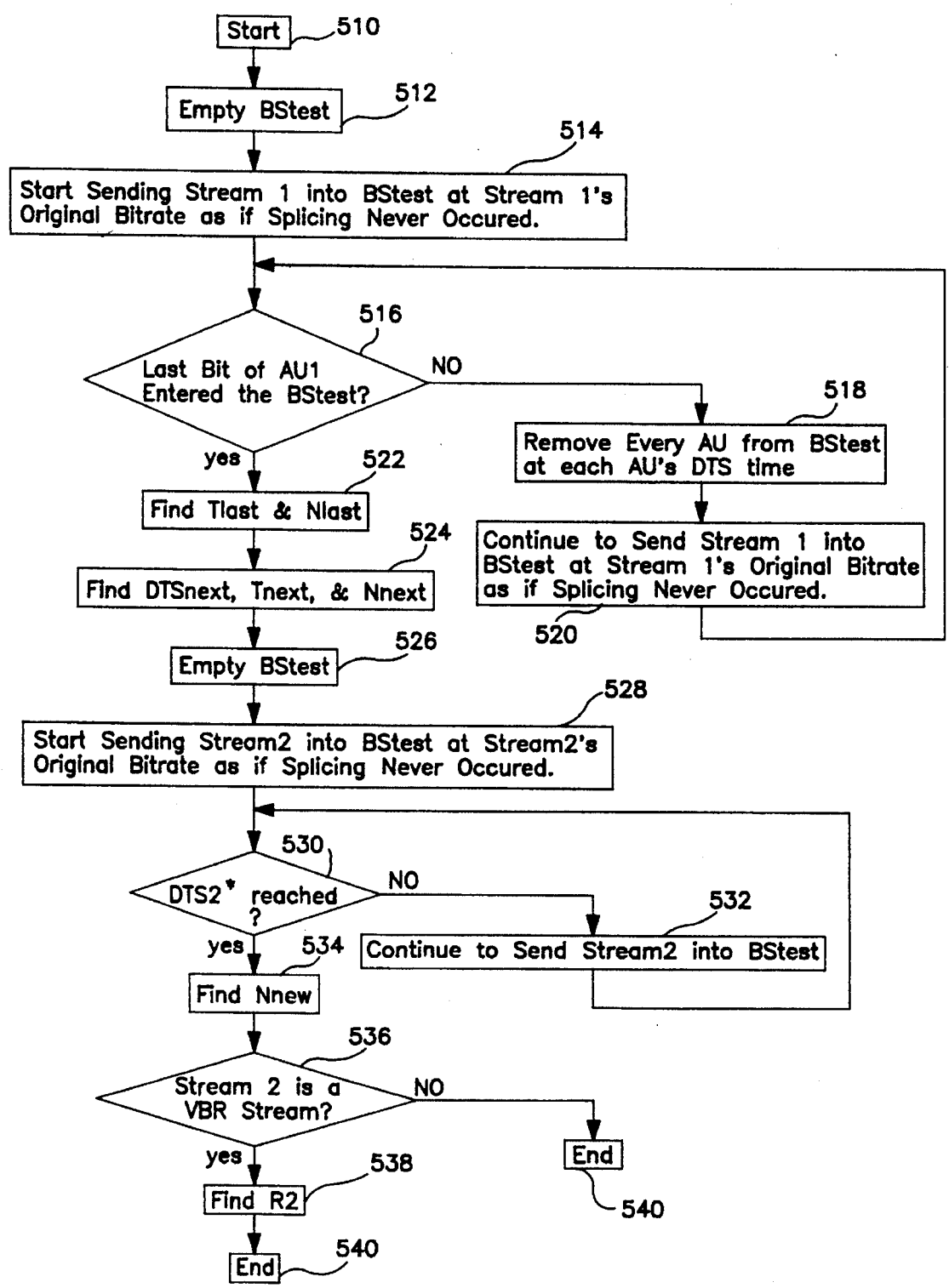
FIG. 5 is a flow-chart diagram of a process which extracts parameter values from the main and inserted data stream.
Figure 6:
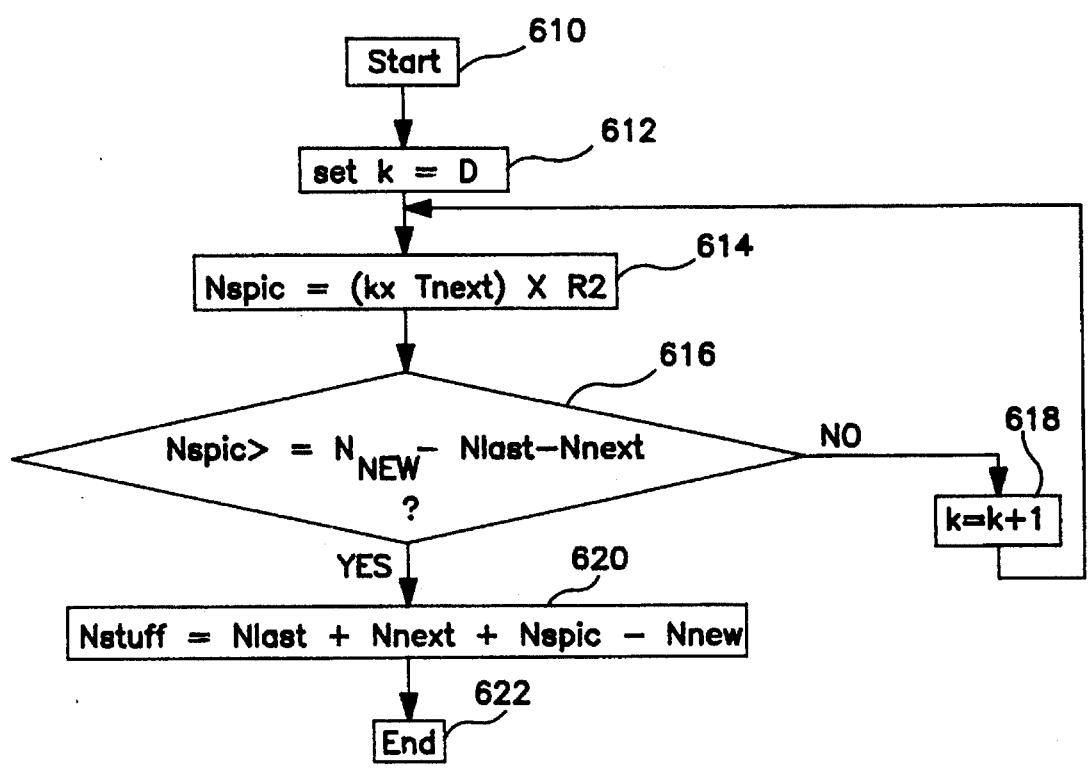
FIG. 6 is a flow-chart diagram of a process which calculates a number of stuffing bits to be inserted from the extracted parameters.

FIG. 5 is a flow-chart diagram which illustrates the process that controls the processor 412 in gathering information about the sequences STREAM1 and STREAM2. This process begins at step 510. At step 512, the processor initializes the buffer 414 by setting its write address pointer to the beginning of the buffer. At step 514, the processor sends STREAM1 to the buffer at the data rate specified in the sequence header for STREAM1. It is noted that in the exemplary embodiment of the invention, both STREAM1 and STREAM2 are stored signals (e.g. recovered from digital video tape recorders). Thus, the signals may be accessed twice, once to determine splicing parameters and again to perform the actual splicing operation. For splicing two signals which are not stored but come, for example, from a satellite feed, a compensating delay (not shown) may be needed so that the splicing parameters may be determined before the actual splicing operation occurs.

At step 514, the process determines if the insertion point, immediately after the picture represented by access unit AU1 has been stored into the buffer 414. Until AU1 is received, every access unit that is received, is removed from the buffer 414 at the time indicated by the decoding time stamp (DTS) field of the access unit. In other words, the data is removed from the buffer 414 in the same sequence and with the same timing that it would be removed from an input buffer by a decoder, such as the decoder 420 shown in FIG. 4. Even when each access unit is removed, the sequence STREAM1 continues to be provided at its proper data rate, as indicated by step 520, and control is transferred to step 516 to determine if AU1 has been received.

Once access unit AU1 has been received, control transfers to step 522 to determine values for $T_{last}$ and $N_{last}$. As shown in FIG. 2a, $T_{last}$ is the difference in time between when AU1 was received and DTS1, the decoding time stamp for AU1, the time at which AU1 is to be read from the input buffer for processing. $N_{last}$ is a number of bits transferred during the time interval $T_{last}$. If STREAM1 is a constant bit-rate stream then $N_{last}$ is simply the $T_{last}$ times the bit-rate. If STREAM1 is a variable bit-rate stream, however, $N_{last}$ may be any number of bits less than the VBV buffer size. In a practical application where STREAM1 is a variable bit-rate stream, $N_{last}$ may be $T_{last}$ times Rmax, where Rmax is the maximum bit rate for the variable rate stream as long as $N_{last}*T_{last}$ does not exceed the VBV buffer size.

Next, at step 524, the process determines values for $DTS_{next}$, $T_{next}$, and $N_{next}$. $DTS_{next}$ is the time to the next decoder time stamp after DTS1. In the MPEG standard, the decoder time stamps occur at regular intervals. Accordingly, $DTS_{next}$ may be determined by calculating the difference between DTS1 and the preceding decoder time stamp and then adding this difference to DTS1. Alternatively, this value may be determined by monitoring STREAM1, extracting the DTS values from the access unit headers which follow AU1 until a DTS other than DTS1 is encountered. As shown in FIG. 2a, Tnext is calculated by subtracting DTS1 from $DTS_{next}$. Likewise, $N_{next}$, the number of bits of data which will be stored into the buffer during the time interval $T_{next}$, is calculated by multiplying $T_{next}$ by the data rate, R1, of STREAM1 or by any rate which is less than or equal to the maximum data stream rate, Rmax[p.1], as defined in ISO/IEC 13818-1 and ISO/IEC 13818-2. This data rate is available from the sequence header. If STREAM1 is a variable rate data stream, as shown in FIG. 3a, R1 is any data rate which is less than or equal to the maximum data rate for the data stream, $R_{max}$ [p.1], as defined in ISO/IEC 13818-1 and ISO/IEC 13818-2.

At step 526, once these values have been determined, the process again empties the buffer 414 and, at step 528, begins storing data from STREAM2 into buffer 414. This data is stored into the buffer at the bit rate of STREAM2. As shown by the loop including step 532, the data is stored until a time corresponding to the decoder time stamp for the first access unit of STREAM2. This time is designated DTS2*. The amount of data stored in buffer 414 at DTS2* is designated as $N_{new}$ and this value is saved by the process at step 534. At step 536, the process determines whether STREAM2 is a fixed rate stream or a variable rate stream. If it is a variable rate stream, control is transferred to step 538 to determine a value R2, representing the bit rate of STREAM2. In this instance, R2 is assigned the average value of the data rates over the time interval defined by DTS2*. It is contemplated that R2 may be any rate between this average data rate and the maximum data rate allowed for STREAM2, as determined from its sequence header. At step 540, the process of collecting the parameters ends.

After the parameters have been determined, the processor 412 calculates the value NSTUFF. This process starts at step 610 of FIG. 6. At step 612, a temporary variable K is set to zero. Next, step 614 calculates a value $N_{splc}$, representing an amount of data which is to be written into the buffer having the data rate R2.

In some splices, the amount of data represented by $N_{new}$ may not be able to be stored into the buffer, at the data rate R1, during the time interval $T_{next}$. This situation is handled by the loop which includes the steps 614, 616 and 618. At step 614, a trial value for $N_{splc}$ is determined as the product of K, $T_{next}$ and R2. At step 616, this trial value is compared to the quantity $N_{new}$ minus $N_{last}$ minus $N_{next}$.

If, however, $N_{splc}$ is greater than or equal to $N_{new}$ minus $N_{last}$ minus $N_{next}$ at step 616, then control is transferred to step 620 to determine the value of NSTUFF according to equation (1).

$$NSTUFF = N_{last} + N_{next} + N_{splc} - N_{new} \qquad (1)$$

At step 622, the process ends. The inventors have determined that if this number of stuffing bits are added before the inserted sequence STREAM2, there will be no overflow of the input buffer when the data stream is received.

Figure 7:
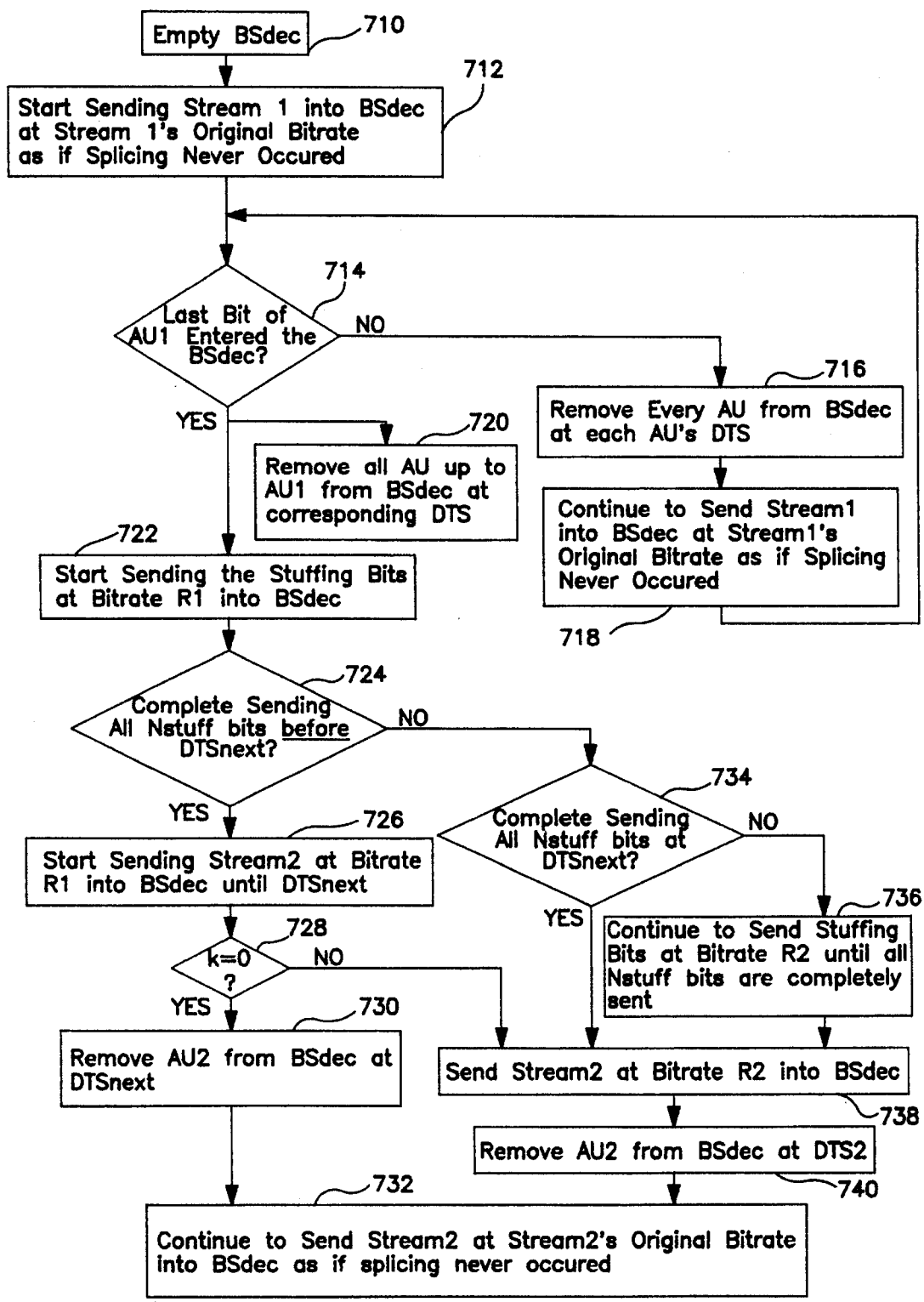
FIG. 7 is a flow-chart diagram of an insertion process which inserts the number of stuffing bits calculated in FIG. 6 between the insertion point between in main sequence and the start of the inserted sequence.

After a suitable value of NSTUFF has been determined, the processor 412 executes the process shown in FIG. 7 to splice STREAM2 to STREAM1. This process begins at step 710 by emptying the buffer BSdec, 416, shown in FIG. 4. At step 712, the processor 412 sends data from STREAM1 into buffer 416 at the data rate of STREAM1. At step 714, the process determines if the last bit of AU1 has been written into buffer 416. If not, the process continues to provide data from STREAM1 until AU1 has been stored as indicated by steps 716 and 718, removing any AU's prior to AU1 at intervals corresponding to their decoder time stamps (DTS's).

After AU1 has been stored, the process, at step 720 removes any AU's in the buffer 416 which precede and include AU1 at the corresponding decoding time stamp of each AU. Starting from the time that AU1 has been stored, the process, at step 722 sends NSTUFF stuffing bits to buffer 416 at the bit rate R1. At step 724, the process determines if all NSTUFF of the stuffing bits were sent before the time $DTS_{next}$. If not, control transfers to step 734 which determines if all NSTUFF of the stuffing bits were sent at the time $DTS_{next}$. If this condition is not met, step 736 is executed to send the remaining stuffing bits at rate R2 to buffer 416.

If, however, at step 724, it was determined that the NSTUFF stuffing bits had been sent before $DTS_{next}$, step 726 is executed which begins sending the initial part of STREAM2 to buffer 416 at bit-rate R1. At step 728, the process determines if the variable K has a value of zero. If not, control transfers to step 738 in which data from STREAM2 is sent to buffer 416 at the bit-rate R2. Step 738 is also executed after step 734 if it is determined that NSTUFF bits have been sent at time $DTS_{next}$ and after step 736. After step 738, step 740 is executed which removes AU2 from buffer 416 at a time corresponding to DTS2.

Although the embodiments described above have used stuffing bits as the null information that is inserted between the spliced bit-streams, it is contemplated that other types of null information, for example, null packets, could be used in appropriate circumstances. Alternatively codes that result "null time" may also be used. These codes may, for example, temporarily suspend entering data into the VBV buffer. Whatever protocol is used, it is assumed that both the encoder and decoder operate according to the same protocol so that no information enters the VBV buffer during the defined time period.

Figure 7A:
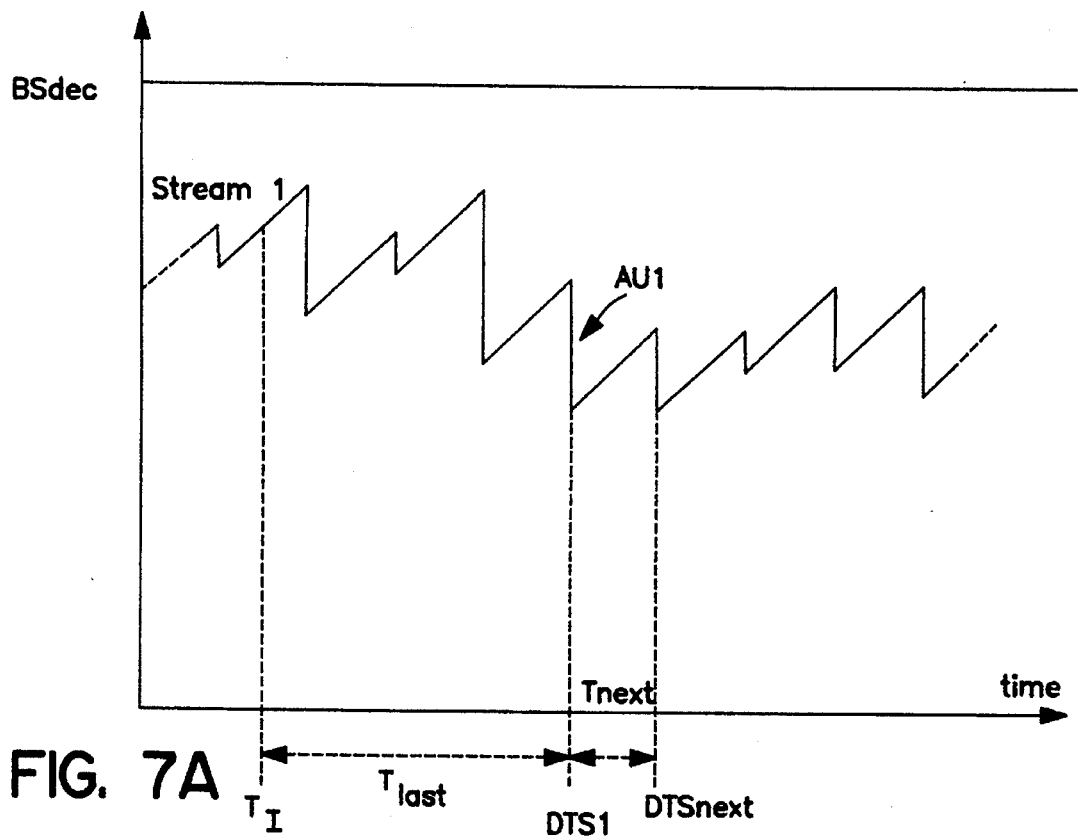
FIGS. 7a, 7b and 7c are graphs of buffer fullness versus time which are useful for explaining the operation of the present invention when the variable k, in FIG. 7, has a value of one.
Figure 7B:
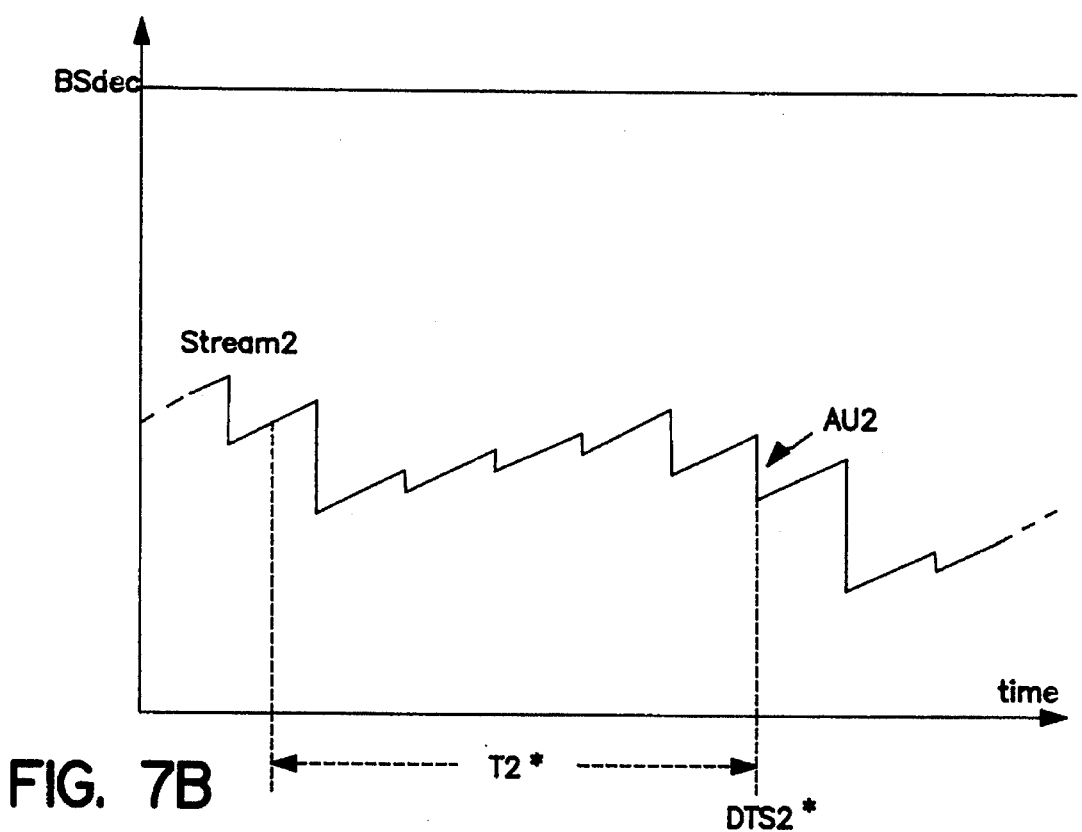
Figure 7C:
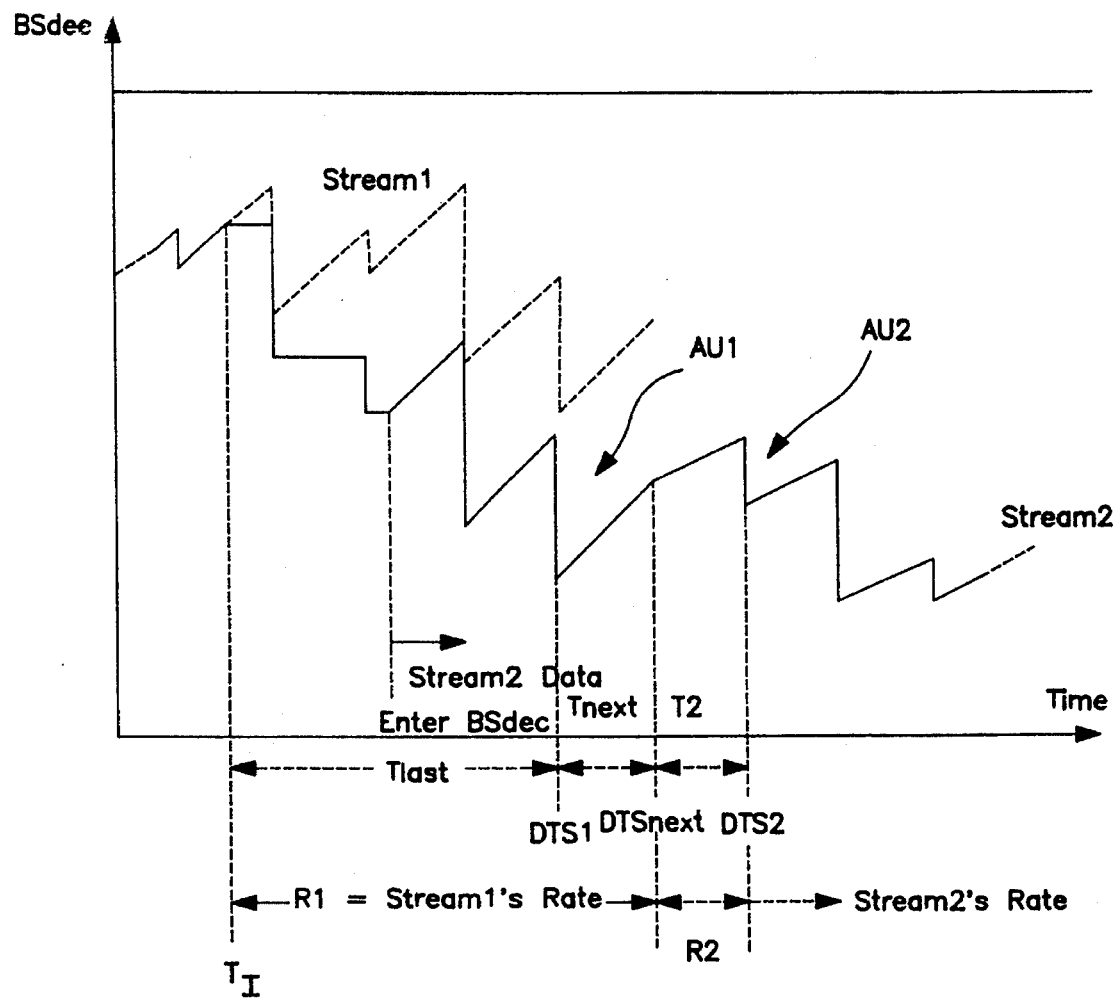

FIGS. 7a, 7b and 7c are graphs of buffer fullness versus time which show a splice in which K has a value of one. In FIG. 7c, it is noted that between the time indicated by $DTS_{next}$ and the time indicated by DTS2, the bit rate is R2, the bit rate of STREAM2, if STREAM2 is a constant bit-rate sequence, and it is the average bit-rate during T2* (shown in FIG. 7b) if STREAM2 is a variable bit-rate sequence.

If, however, at step 728, it is determined that the variable K is equal to zero, then at step 730, first access unit of STREAM2, AU2, is removed from buffer. After step 730 or step 740, step 732 is executed which continues to provide data from STREAM2, at the bit-rate of STREAM2. This is the last step of the splicing process.

As shown in FIG. 4, data is removed from buffer 416 and applied to the input buffer 424 of the decoder 420. The buffer 424 ignores the stuffing bits, effectively delaying the application of the STREAM2 data until sufficient data has been removed from the input buffer 424, by the processor 422, to make room for the STREAM2 data.

The embodiments described above use the interval between successive decoding time stamps as the interval in which the amount of data in STREAM1 and STREAM2 are measured. Alternatively, other time intervals may be used. In one alternative embodiment, for example, the interval may be a frame interval and the number of bits provided in either STREAM1 or STREAM2 may be the number of bits that are provided in a frame interval. For constant bit-rate streams, this number may be calculated as the bit-rate times the frame interval. For variable bit-rate streams, this number may be the maximum bit rate times the frame interval. In this alternative embodiment, $N_{last}$ may be the number of bits provided in STREAM1 during one frame interval; $N_{next}$ may be the number of bits provided in STREAM2 during one frame interval, $N_{splc}$ may be determined as an integer, K, times $N_{next}$. The value for $N_{new}$ in this embodiment is the same as in the previous embodiment. Using this alternative embodiment, the amount of null information (or null time), NSTUFF, that needs to be inserted into the bit-stream is defined by the equation (2).

$$NSTUFF = N_{last} + K*N_{next} - N_{new} \qquad (2)$$

In equation (2), K is an integer number that satisfies the inequality $K*N_{next} \geq N_{new} - N_{last}$. In addition, the value of K may depend on the two data streams that are being spliced. For example, if the two data streams are constant bit-rate streams having different rates, a larger value for K may be desirable to maintain the constant bit rate for STREAM2. In addition, larger values of K may be desirable for some applications that need to maintain field parity consistency across the sequence boundary or that need longer time intervals to respond to changes in sequence header parameters between STREAM1 and STREAM2. One of ordinary skill in the art of editing MPEG bit-streams could readily determine suitable values of K for a particular application.

While the invention has been described in terms of an exemplary embodiment, it is contemplated that it may be practiced as described above in accordance with the following claims.

What is claimed:

1. A method of splicing first and second data streams representing respective first and second encoded signals at a selected boundary in the first data stream using a buffer, wherein each of the first and second data streams has a plurality of decoding time stamps representing times at which data is retrieved from the buffer, the method comprising the steps of:

analyzing the first and second data streams to determine an amount of null information to be inserted in the first data stream after the selected boundary, wherein The amount of null data is determined from the decoding time stamps in the first and second data streams;

transmitting the first data stream, up to the selected boundary to the buffer;

transmitting the determined amount of null information to the buffer;

transmitting the second data stream to the buffer; and retrieving the spliced data stream from the buffer.

2. A method according to claim 1, wherein the step of transmitting the second data stream to the buffer includes the steps of:

transmitting a first portion of the second data stream to the buffer at the data rate of the first data stream; and transmitting a second portion of the second data stream to the buffer at the data rate of the second data stream.

3. A method according to claim 2, wherein the data streams are bit-streams encoded according to a standard developed by the motion-picture experts group (MPEG) and the amount of null information is a number of stuffing bits to be inserted before a sequence start code of the second data stream.

4. A method according to claim 3, wherein the amount of null information is determined by the equation:

$$\text{NSTUFF} = N_{last} + N_{next} + N_{splc} - N_{new}$$

where $N_{last}$ represents a number of bits in the first data stream between the time that data following the selected boundary is stored into the buffer and the decoder time stamp at which the data following the selected boundary is retrieved from the memory; $N_{next}$ represents a number of bits of the first data stream that would be provided in an interval between two decoder time stamps; $N_{splc}$ represents a number of bits of the first bit-stream that would be provided in an integer number of intervals between decoder time stamps of the first data stream, the number of bits being greater than or equal to $N_{new}$, the number of bits in the second data stream occurring before the first decoder time stamp of the second data stream.

5. A method according to claim 1 wherein the first and second data streams are constant bit-rate data streams and the step of analyzing the first and second data streams to determine the amount of null data is responsive to the respective bit-rates of the first and second data streams.

6. A method according to claim 1 wherein the first data stream is a constant bit-rate data stream and the second data stream is a variable bit-rate data stream having a maximum bit-rate and the step of analyzing the first and second data streams to determine the amount of null data is responsive to the bit-rate of the first data stream and to the maximum bit-rate of the second data stream.

7. A method according to claim 1 wherein the first data stream is a variable bit-rate data stream having a maximum bit-rate and the second data stream is a constant bit-rate data stream and the step of analyzing the first and second data streams to determine the amount of null data is responsive to the maximum bit-rate of the first data stream and to the bit-rate of the second data stream.

8. A method according to claim 1 wherein the first and second data streams are variable bit-rate data streams, each having a respective maximum bit-rate, and the step of analyzing the first and second data streams to determine the amount of null data is responsive to the respective maximum bit-rates of the first and second data streams.

9. A method according to claim 1 further including the steps of:

analyzing the first data stream to determine if the first data stream includes a sequence end code immediately before the selected boundary; and transmitting the sequence end code to the buffer after the first data stream is transmitted to the buffer when the first data stream does not include a sequence end code immediately before the selected boundary.

10. A method according to claim 1 further including the steps of:

analyzing the second data stream to determine if the second data stream begins with a sequence start code; and transmitting the sequence start code to the buffer before the second stream is transmitted to the buffer when the second data stream does not begin with a sequence start code.

11. A method of splicing first and second data streams representing respective first and second encoded video signals at a selected boundary in the first data stream using a buffer, wherein each of the first and second video signals has a frame rate and wherein the second data stream has at least one a decoding time stamp representing a time at which data is retrieved from the buffer, the method comprising the steps of:

analyzing the first and second data streams to determine an amount of null information to be inserted in the first data stream after the selected boundary, wherein The amount of null data is determined from the frame rates of the first and second video signals and the decoding time stamp of the and second data stream;

transmitting the first data stream, up to the selected boundary to the buffer;

transmitting the determined amount of null information to the buffer;

transmitting the second data stream to the buffer; and retrieving the spliced data stream from the buffer.

12. A method according to claim 11, wherein the amount of null information is determined by the equation:

$$\text{NSTUFF} = N_{last} + K^* N_{next} - N_{new}$$

where $N_{last}$ represents a number of bits in the first data stream between the time that data following the selected boundary is stored into the buffer during a frame interval of the first video signal; Nnext represents a number of bits of the second data stream that would be provided in one frame interval of the second video signal; Nnew represents the number of bits in the second data stream occurring before the decoder time stamp of the second data stream and the value of K is determined by the inequality $K^* N_{next} \geq N_{new} - N_{last}$.

13. Apparatus for splicing first and second data streams representing respective first and second encoded signals at a selected boundary in the first data stream using a buffer, wherein each of the first and second data streams has a plurality of decoding time stamps representing times at which data is retrieved from the buffer, the method comprising the steps of:

means for analyzing the first data stream to determine an amount of null information to be inserted in the first data stream after the selected boundary, wherein The amount of null data is determined from the decoding time stamps in the first and second data streams;

means for transmitting the first data stream, up to the selected boundary to the buffer;

means for transmitting the determined amount of null information to the buffer;

means for transmitting the second data stream to the buffer; and means for retrieving the spliced data stream from the buffer.

14. Apparatus according to claim 13, wherein the first data stream has a constant data rate and the means for transmitting the second data stream to the buffer includes:

means for transmitting a first portion of the second data stream to the buffer at the data rate of the first data stream; and means for transmitting a second portion of the second data stream to the buffer at a data rate determined from the second data stream.

15. Apparatus according to claim 13 further comprising:

means for analyzing the first data stream to determine if the first data stream includes a sequence end code immediately before the selected boundary; and means for transmitting the sequence end code to the buffer after the first data stream is transmitted to the buffer when the first data stream does not include a sequence end code before the selected boundary.

16. Apparatus according to claim 13 further comprising:

means for analyzing the second data stream to determine if the second data stream begins with a sequence start code; and means for transmitting the sequence start code to the buffer before the second stream is transmitted to the buffer when the second data stream does not begin with a sequence start code.

* * * * *